United States Patent
Beck et al.

[19]

[11] Patent Number: 6,055,557
[45] Date of Patent: Apr. 25, 2000

[54] ADDER CIRCUIT AND METHOD THEREFOR

[75] Inventors: John Andrew Beck; James Edward Dunning; John Stephen Muhich, all of Austin, Tex.

[73] Assignees: International Business Machines Corp., Armonk, N.Y.; Motorola, Inc., Schaumburg, Ill.

[21] Appl. No.: 08/780,561

[22] Filed: Jan. 8, 1997

[51] Int. Cl.[7] .................................................. G06F 7/50
[52] U.S. Cl. .......................... 708/700; 708/702; 708/710
[58] Field of Search ........................ 364/787.01, 787.02, 364/787.03, 787.04, 788, 778, 780; 371/52; 708/700, 702, 710

[56] References Cited

U.S. PATENT DOCUMENTS

| | | | |
|---|---|---|---|
| 3,564,228 | 2/1971 | Herger | 708/679 |
| 4,675,838 | 6/1987 | Mazin et al. | 364/788 |
| 4,805,131 | 2/1989 | Adiletta et al. | 364/783 |
| 5,007,010 | 4/1991 | Flora . | |
| 5,117,386 | 5/1992 | Persoon et al. | 364/787.01 |
| 5,136,539 | 8/1992 | Kumar | 364/787.01 |
| 5,146,423 | 9/1992 | Fischer et al. . | |
| 5,299,145 | 3/1994 | Yoshida | 708/498 |
| 5,450,340 | 9/1995 | Nicolaidis . | |
| 5,485,411 | 1/1996 | Guttag et al. . | |
| 5,499,203 | 3/1996 | Grundland . | |
| 5,506,621 | 4/1996 | Ogasawara et al. | 348/396 |
| 5,508,952 | 4/1996 | Kantabutra | 364/787.01 |
| 5,565,991 | 10/1996 | Enari | 358/261.1 |
| 5,579,254 | 11/1996 | Kumar et al. | 364/788 |
| 5,619,442 | 4/1997 | Opris | 364/787.01 |
| 5,631,860 | 5/1997 | Morinaka | 364/787.01 |
| 5,732,008 | 3/1998 | Abu-Khater et al. | 364/788 |

*Primary Examiner*—Tan V. Mai
*Attorney, Agent, or Firm*—Winstead Sechrest & Minick P.C.; Anthony V. S. England

[57] ABSTRACT

An adder (300) generates encoded outputs to conserve power. In particular, the adder provides "B2" encoded outputs which only drive one bit per every two bits at a time on conductive lines in a data processing system. A binary input is encoded by an encoder (800, 304) to generate a plurality of bits. The plurality of bits are concatenated to form a plurality of sum values. A portion of the plurality of sum values are then selectively output in response to a logic value of a carry kill signal, a carry generate signal, and a carry propagate signal.

19 Claims, 7 Drawing Sheets

| $C_{G2}$ | $C_{G3}$ | $C_{P3}$ | $C_{P2}$ | $C_{PROP}$ |
|---|---|---|---|---|
| 1 | * | * | * | 1 |
| 0 | * | * | 0 | 0 |
| 0 | 0 | 0 | 1 | 0 |
| 0 | 0 | 1 | 1 | 1 |
| 0 | 1 | 0 | 1 | 1 |
| 0 | 1 | 1 | 1 | 1 |

FIG. 5

| $C_{K2}$ | $C_{K3}$ | $C_{P2}$ | $C_{GEN}$ |
|---|---|---|---|
| 1 | * | * | 1 |
| 0 | * | 0 | 0 |
| 0 | 0 | 1 | 0 |
| 0 | 1 | 1 | 1 |

FIG. 9

| $C_{G0}$ | $C_{P0}$ | $C_{K0}$ | $C_{G1}$ | $C_{P1}$ | $C_{K1}$ | $S_0$ | $S_1$ | $S_2$ | $S_3$ |
|---|---|---|---|---|---|---|---|---|---|
| 0 | 0 | 1 | 0 | 0 | 1 | 1 | 0 | 0 | 0 |
| 0 | 0 | 1 | 0 | 1 | 0 | 0 | 1 | 0 | 0 |
| 0 | 0 | 1 | 1 | 0 | 0 | 0 | 0 | 1 | 0 |
| 0 | 1 | 0 | 0 | 0 | 1 | 0 | 0 | 1 | 0 |
| 0 | 1 | 0 | 0 | 1 | 0 | 0 | 0 | 0 | 1 |
| 0 | 1 | 0 | 1 | 0 | 0 | 1 | 0 | 0 | 0 |
| 1 | 0 | 0 | 0 | 0 | 1 | 1 | 0 | 0 | 0 |
| 1 | 0 | 0 | 0 | 1 | 0 | 0 | 1 | 0 | 0 |
| 1 | 0 | 0 | 1 | 0 | 0 | 0 | 0 | 1 | 0 |

ADDER CIRCUIT AND METHOD THEREFOR

TECHNICAL FIELD

The present invention relates in general to an adder circuit, and in particular, to an adder circuit which provides an encoded output.

BACKGROUND INFORMATION

Adders are well known in the data processing art as circuits which perform mathematical addition. Typically, such adders perform this addition operation by using binary inputs to generate binary outputs using "carry" information with a full adder circuit implementation or by not using "carry" information with a half adder circuit implementation.

It is possible to build multi-bit adder circuits using much the same form as the full and half adder circuits known in the data processing art. For multi-bit adders, a common implementation combines the binary inputs to form "carry generate" ($C_g$), "carry propagate" ($C_p$) and "carry kill (also referred to as "carry zero") ($C_k$ or $C_z$) signals, which ease generation of the "carry out" signal. A general set of equations for representing these signals are:

$$C_g(i) = A(i) \text{ AND } B(i);$$

$$C_p(i) = A(i) \text{ XOR } B(i);$$

$$C_k(i) = \overline{A(i) \text{ OR } B(i)}.$$

Forming the full-adder Sum bit using the $C_g$, $C_p$, and $C_k$ signals can be represented as:

$$\text{Sum}(i) = \{\text{Carry\_in}(i) \text{ AND } [C_k(i) \text{ OR } C_g(i)]\} \text{ OR } C_p(i).$$

To generate the carry-in(i) signal, a recursive equation is used of the form:

$$\text{Carry\_in}(i-1) = C_g(i-1) \text{ OR } C_p(i-1) \text{ AND } [C_g(i-2) \text{ OR } C_p(i-2) \text{ AND } \{ \ \}],$$

where the "$C_g(\ )$ OR $C_p(\ )$ AND" becomes a recursion, back to the Carry_in signal, and would be placed in the "{ }" above. There exist many different circuits to implement the "Carry_in(i)" term for each successive full-adder.

It should be noted that the adders described above, as well as other types of adders implemented in prior art systems, generally provide a binary output. For information on BCD and binary adders, refer to U.S. Pat. No. 5,007,010 by Laurence P. Flora, issued Apr. 9, 1991 and U.S. Pat. No. 5,450,340 by Michael Nicolaidis, issued Sep. 12, 1995. With binary true/complement outputs, one bit will be driven to a logic high level during operation of the adder. This requirement will result in excessive power consumption in some data processing applications as multiple lines must be driven to a logic high level many times during operation thereof.

As power consumption becomes increasingly important in today's portable data processing applications, the power consumed by a commonly used element, such as an adder, in a data processing system, becomes increasingly relevant. Thus, it is desirable to decrease the power consumption of an adder circuit in such data processing systems.

SUMMARY OF THE INVENTION

The previously mentioned needs are fulfilled with the present invention. Accordingly, there is provided, in a first form, an adder for generating a result of an addition operation. The adder includes an input circuit for receiving a carry signal. An encoder is connected to the input circuit for receiving the carry signal. The encoder provides a first encoded sum value to generate the result of the addition operation in response to the carry signal.

There is provided, in a second form, a method for adding a first value and a second value to generate a sum. The method includes the steps of generating a carry value in response to the first value and the second value and encoding the carry value using a first encoding technique to generate a first encoded sum. The first encoded sum is selectively provided to an output circuit.

Furthermore, there is provided, in a third form, an adder system which includes a logic circuit for receiving a first value and a second value, the logic circuit generating a carry signal and an adder circuit. The adder circuit includes a first carry logic circuit which is connected to the logic circuit for receiving a first portion of the carry signal and for generating a first carry generate signal. A second carry logic circuit is connected to the logic circuit for receiving a second portion of the carry signal and for generating a second carry generate signal. A first encoder is connected to the logic circuit for receiving a third portion of the carry signal and for generating a first encoded sum and an incremented first encoded sum. A second encoder is connected to the logic circuit for receiving a fourth portion of the carry signal and for generating a second encoded sum and an incremented second encoded sum. A first multiplexer is connected to the first carry logic circuit for receiving the first carry generate signal and is connected to the first encoder for receiving the first encoded sum and the incremented first encoded sum. The first multiplexer generates a first portion of a result. A second multiplexer is connected to the second carry logic circuit for receiving the second carry generate signal and is connected to the second encoder for receiving the second encoded sum and the incremented second encoded sum. The second multiplexer generates a second portion of the result.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 8-A illustrates, in circuit diagram form, an encoder of the adder of FIG. 3;

FIG. 8-B illustrates, in circuit diagram form, a second portion of the encoder of the adder of FIG. 8-A.

DETAILED DESCRIPTION

Adders are very well-known in the data processing art and are integral to most data processing applications. Inherent in most prior art implementations of adder circuits is a requirement that the output be provided in a binary format. While this binary format is well-known and commonly used, this binary format requires multiple bits to be driven concurrently on conductive lines in the data processing system. Such concurrent enablement of bits requires additional power which may be a scarce resource in today's portable data processing applications. The present invention implements an adder which does not have the limitations associated with such prior art adder circuits. In particular, the adder of the present invention provides "B2" encoded outputs which only drive one bit at a time on conductive lines in the data processing system. Because only one bit is asserted at a time, power is conserved. In the present adder, the encoding to the "B2" format is included within the adder itself and a stage of encoding logic is eliminated. The "B2" encoding scheme is illustrated below:

TABLE 1

| A | B | B2 encoded results |
|---|---|---|
| 0 | 0 | 0001 |
| 0 | 1 | 0010 |
| 1 | 0 | 0100 |
| 1 | 1 | 1000 |

The operation and implementation of the adder of the present invention will subsequently be described in greater detail. It should be noted that, in the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

It should also be noted that a group of bits comprising a bus will be referred to as Z<x> in the following description of the invention. The "Z" value indicates a signal name and the "x" value indicates a bit or a group of bits which is transferred via that signal. For example, if a signal is denoted as Z<0>, then bit 0 of the Z signal is being provided. Additionally, if a signal is denoted as Z<0:3>, four bits, 0 through 3, of the Z signal are being communicated. Additionally, a signal denoted as $Z_0$ corresponds to a Z<0> signal and indicates that bit 0 of the Z signal is being provided. Furthermore, it should be noted that a number of bits utilized herein is provided by way of example only and is not intended to limit the scope of the present invention. It would be well-known to one with skill in data processing art to modify a number of bits in a particular data processing application.

Furthermore, during a following description of the implementation of the invention, the terms "assert" and "negate," in various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or a register bit into its inactive, or logically false state.

Refer now to the drawings wherein depicted elements are not necessarily shown to scale and wherein like or similar elements are designated by the same reference numeral through the several views.

Description of Connectivity

Figure 1:
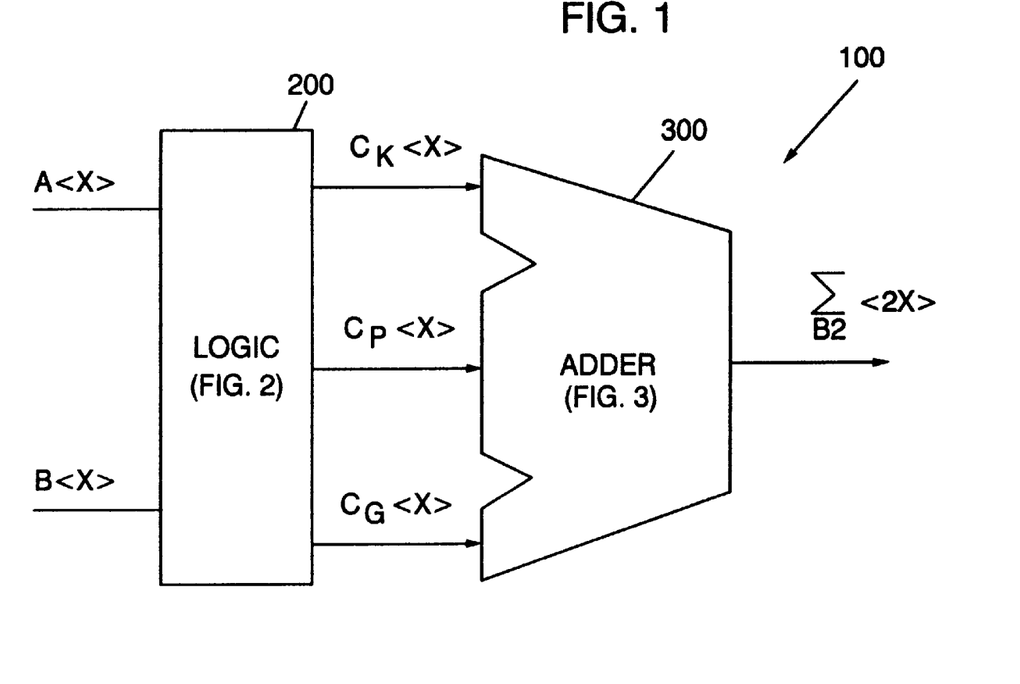
FIG. 1 illustrates, in block diagram form, an adder in accordance with one embodiment of the present invention.

FIG. 1 illustrates an adder circuit 100 comprising a logic circuit 200 and an adder 300. An A<x> bus is provided to logic circuit 200. Additionally, a B<x> bus is provided to logic circuit 200. Logic circuit 200 provides a $C_k$<x> bus, a $C_p$<x> bus, and a $C_g$<x> bus to adder 300. Adder circuit 300 provides a summation output which may be represented by the equation: $\Sigma_{B2}$<2x>.

Figure 2:
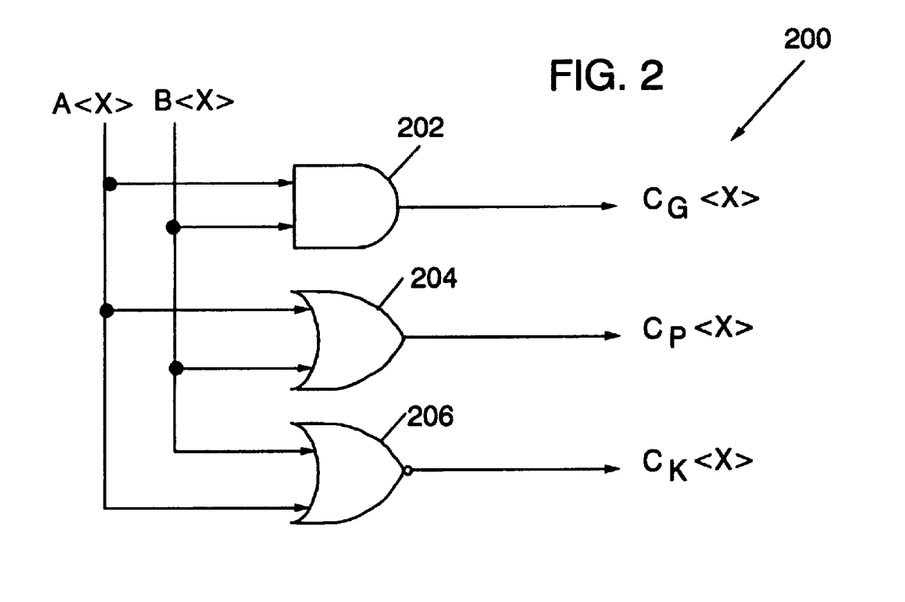
FIG. 2 illustrates, in logic diagram form, a logic circuit of the adder of FIG. 1.

Logic circuit 200 is illustrated in greater detail in FIG. 2. Logic circuit 200 comprises an AND gate 202, an OR gate 204, and a NOR gate 206. The A<x> bus is provided to a first input of each of AND gate 202, OR gate 204, and NOR gate 206. Similarly, the B<x> bus is provided to a second input of each of AND gate 202, OR gate 204, and NOR gate 206. AND gate 202 provides the $C_g$<x> bus. OR gate 204 provides the $C_p$<x> bus and NOR gate 206 provides the $C_k$<x> bus.

Figure 3:
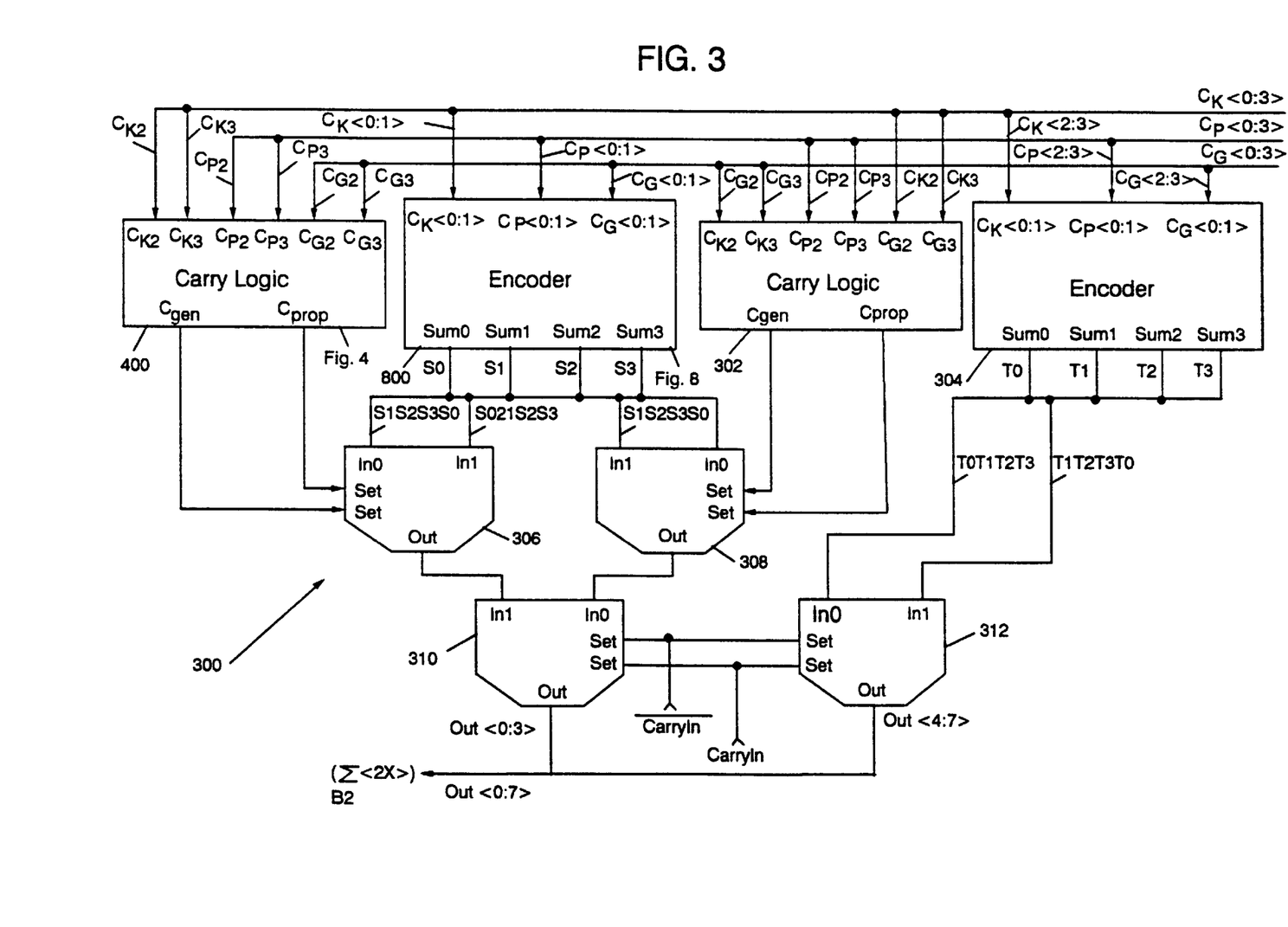
FIG. 3 illustrates, in block diagram form, the adder circuit of FIG. 1 in greater detail.

Adder 300 is illustrated in greater detail in FIG. 3. Adder 300 comprises a carry logic circuit 400, an encoder 800, a carry logic circuit 302, an encoder 304, a multiplexer 306, a multiplexer 308, a multiplexer 310, and a multiplexer 312. FIG. 3 assumes that each of the $C_k$, $C_p$ and $C_g$ values will comprise 4 bits and an output provided by adder 300 will comprise 8 bits. It should be noted that more or less bits may be used, as necessary, for a particular data processing application. Additionally, during a subsequent discussion it should be noted that a bit labeled "0" is a most significant bit and a bit labeled "1" is a least significant bit.

A $C_{k2}$ and a $C_{k3}$ signal are provided to a $C_{k2}$ and a $C_{k3}$ input of carry logic 400, respectively. A $C_k$<0:1> portion of bits are provided to a $C_k$<0:1> input of encoder 800. Additionally, the $C_{k2}$ signal and the $C_{k3}$ signal are provided to a $C_{g2}$ and a $C_{g3}$ input of carry logic circuit 302, respectively. As well, a $C_k$<2:3> signal is provided to $C_k$<0:1> input of encoder 304. It should be noted that each of the $C_{k2}$, $C_{k3}$, $Ck_{k1}$, and $C_{k0}$ signals is provided by $C_k$<0:3> bus. The $C_p$<0:3> bus provides a $C_{p2}$ and a $C_{p3}$ signal to a $C_{p2}$ and a $C_{p3}$ input of carry logic 400. Additionally, the $C_p$<0:3> bus provides a $C_p$<0:1> signal to a $C_p$<0:1> input of encoder 800. As well, the $C_p$<0:3> bus provides the $C_{p2}$ and the $C_{p3}$ signals to a $C_{p2}$ and a $C_{p3}$ input of carry logic circuit 302, respectively. As well, the $C_p$<0:3> bus provides a $C_p$<2:3> signal to a $C_p$<0:1> input of encoder 304. A $C_g$<0:3> bus provides a $C_{g2}$ and a $C_{g3}$ signal to a $C_{g2}$ and a $C_{g3}$ input of carry logic circuit 400. Furthermore, the $C_g$<0:3> bus provides a $C_g$<0:1> signal to a $C_g$<1:1> input of encoder 800. As well, the $C_g$<0:3> bus provides the $C_{g2}$ and the $C_{g3}$ signals to a $C_{k2}$ and a $C_{k3}$ input of carry logic circuit 302, respectively. The $C_g$<0:3> bus also provides a $C_g$<2:3> signal to a $C_g$<0:1> input of encoder 304.

Carry logic circuit 400 provides a $C_{gen}$ signal to a first set input of multiplexer 306. Carry logic circuit 400 also provides a $C_{prop}$ signal to a second set input of multiplexer 306. Encoder 800 provides an S0 signal from a sum 0 output, an S1 signal from a sum 1 output, an S2 signal from a sum 2 output, and an S3 signal from a sum 3 output. The outputs of encoder 800 are concatenated to form a S1, S2, S3, S0 signal which is provided to an In0 input of multiplexer 306 and an In0 input of multiplexer 308. Additionally, the outputs of encoder 800 are concatenated to form an S0, S1, S2, S3 signal which is provided to the In1 inputs of both multiplexers 306 and 308. Additionally, carry logic circuit 302 provides a $C_{gen}$ output to a first set input of multiplexer 308. Carry logic circuit 302 also provides a $C_{prop}$ output to a second set input of multiplexer 308.

An output of multiplexer 306 is coupled to an In1 input of multiplexer 310. An output of multiplexer 308 is coupled to an In0 input of multiplexer 310. Encoder 304 provides a T0 signal from a sum 0 output, a T1 signal from a sum 1 output, a T2 signal from a sum 2 output, and a T3 signal from a sum 3 output of encoder 304. The T0, T1, T2, and T3 signals are selectively concatenated and provided to multiplexer 312. The signals are concatenated in the form, T0, T1, T2, T3, and provided to an In0 input of multiplexer 312. As well, the signals provided by encoder 304 are concatenated in a form, T1, T2, T3, T0, and provided to an In1 input of multiplexer 312. A Carry In signal and a $\overline{\text{Carry In}}$ are both provided to a first set input and a second set input, respectively, of multiplexers 310 and 312. Multiplexer 310 provides a 4-bit signal, denoted as Out<0:3> from an output thereof. Similarly, multiplexer 312 provides a 4-bit output, denoted as Out<4:7> from an output thereof The Out<0:3> signal and the Out<4:7> signal are concatenated to form an Out<0:7> signal which represents the $\Sigma_{B2}$<2x> output of adder 300 of FIG. 1.

Figure 4:
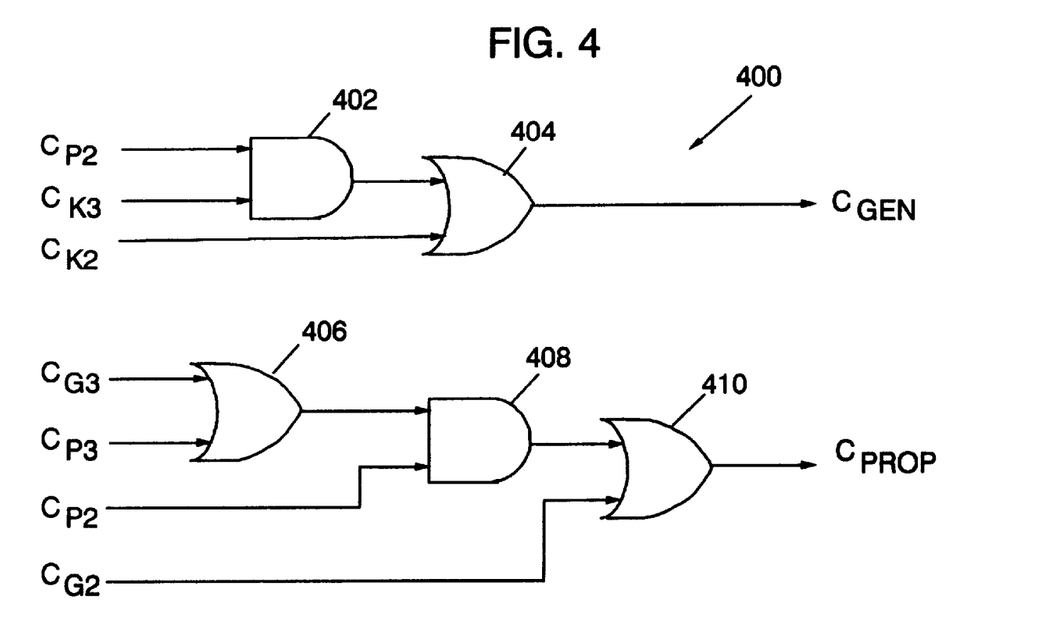
FIG. 4 illustrates, in logic diagram form, a carry logic circuit of the adder of FIG. 3.

FIG. 4 illustrates a logical representation of carry logic circuit 400. Carry logic 400 comprises an AND gate 402, an OR gate 404, an OR gate 406, an AND gate 408, and an OR gate 410. The $C_{p2}$ signals coupled to a first input AND gate 402 and the $C_{k3}$ signal is coupled to a second input of AND gate 402. An output of AND gate 402 is coupled to a first input of OR gate 404. The $C_{k2}$ signal is coupled to a second input of OR gate 404. An output of OR gate 404 provides the $C_{gen}$ signal. Similarly, the $C_{g3}$ signal provides a first input to OR gate 406 and the $C_{p3}$ signal provides a second input to OR gate 406. An output of OR gate 406 is coupled to a first input of AND gate 408. The $C_{p2}$ signal is coupled to a second input of AND gate 408. An output of AND gate 408 is coupled to a first input of OR gate 410. The $C_{g2}$ signal is provided to a second input of OR gate 410. An output of OR gate 410 provides the $C_{prop}$ signal.

Figure 7:
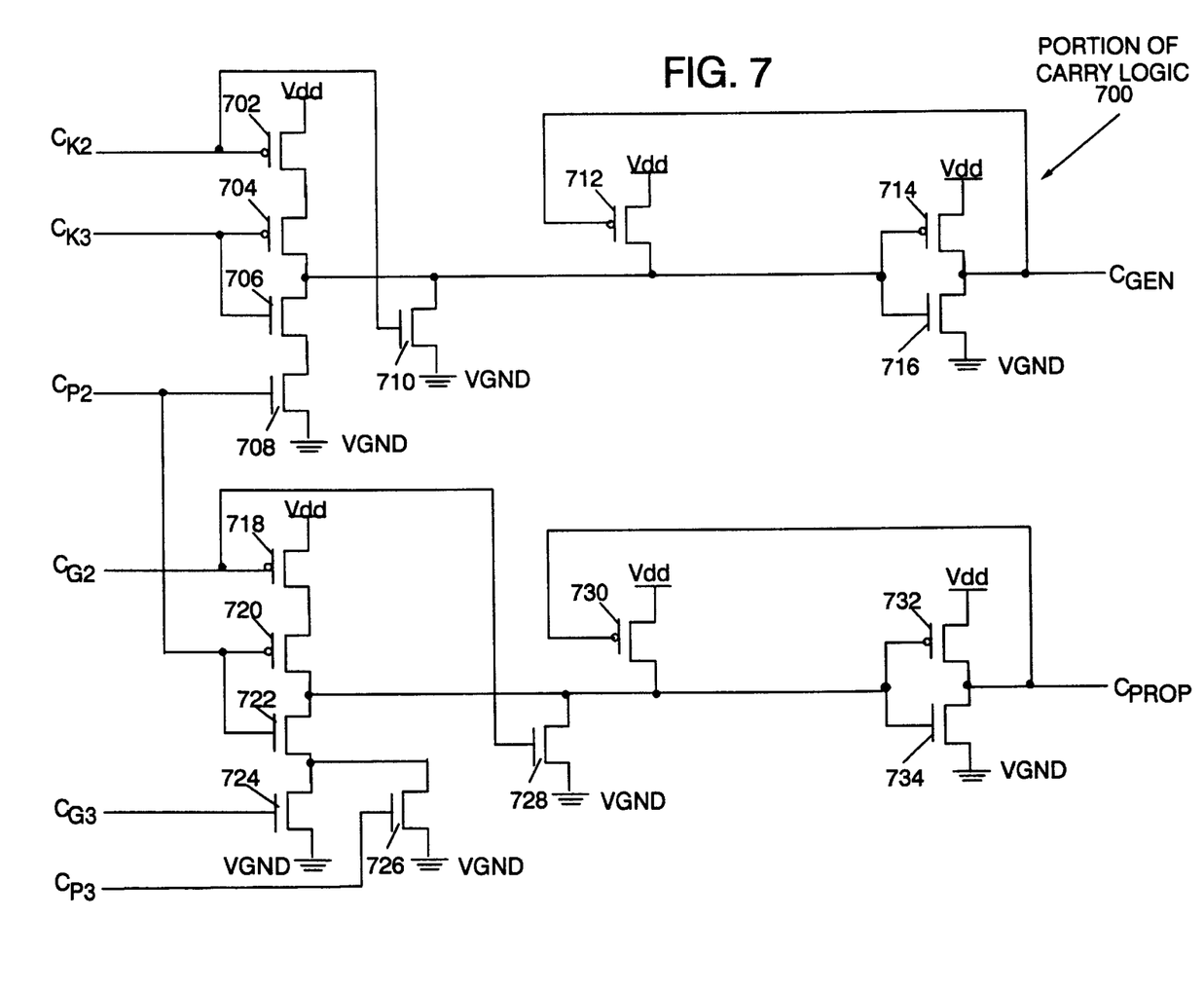
FIG. 7 illustrates, in circuit diagram form, a portion of the carry logic circuit of FIG. 4.

FIG. 7 illustrates a portion of carry logic 700 in greater detail. The portion of carry logic circuit 700 comprises a transistor 702, a transistor 704, a transistor 706, a transistor 708, a transistor 710, a transistor 712, a transistor 714, a transistor 716, a transistor 718, a transistor 720, a transistor 722, a transistor 724, a transistor 726, a transistor 728, a transistor 730, a transistor 732, and a transistor 734. The C. signal is provided to a control input of each of transistor 702 and transistor 710. The first electrode of transistor 702 is coupled to a storage reference voltage $V_{DD}$. A second electrode of transistor 702 is coupled to a first electrode of transistor 704. A control electrode of transistor 704 and a control electrode of transistor 706 are coupled to the $C_{k3}$ signal. A second electrode of transistor 704 is coupled to a first electrode of transistor 706. Additionally, the second electrode of transistor 704 is coupled to a first electrode of transistor 710, a first electrode of transistor 712, a control electrode of transistor 714, and a control electrode of transistor 716. A second electrode of transistor 706 is coupled to a first electrode of transistor 708. A second electrode of transistor 708 is coupled to a ground reference voltage, $V_{gnd}$. Similarly, the second electrode of transistor 710 is coupled to $V_{gnd}$. A second electrode of transistor 712 is coupled to $V_{DD}$. A first electrode of transistor 714 is coupled to $V_{DD}$ and a second electrode of transistor 714 is coupled to a first electrode of transistor 716 and a control electrode of transistor 712. The second electrode of transistor 714 provides the $C_{gen}$ signal. A second electrode of transistor 716 is coupled to $V_{gnd}$.

The $C_{p2}$ signal is provided to a control input of transistor 708, a control input of transistor 720, and a control input of transistor 722. The $C_{g2}$ signal is coupled to a control input of transistor 718, and a control input of transistor 728. The $C_{g3}$ signal is coupled to a control input of transistor 724. The $C_{p3}$ signal is coupled to a control input of transistor 726. A first electrode of transistor 718 is coupled to $V_{DD}$ and a second electrode of transistor 718 is coupled to a first electrode of transistor 720. A second electrode of transistor 720 is coupled to a first electrode of transistor 722, a first electrode of transistor 728, a control electrode of transistor 732, and a control electrode of transistor 734. A second electrode of transistor 722 is coupled to a first electrode of transistor 724 and a first electrode of transistor 726. A second electrode of each of transistor 724 and 726 is coupled to $V_{gnd}$. Additionally, a second electrode of transistor 728 is coupled to $V_{gnd}$. A second electrode of transistor 730 is coupled to $V_{DD}$. A first electrode of transistor 732 is coupled to $V_{DD}$. A second electrode of transistor 732 is coupled to a first electrode of transistor 734 and a control electrode of transistor 730. The second electrode of transistor 732 provides the $C_{prop}$ signal. Finally, a second electrode of transistor 734 is coupled to $V_{gnd}$.

In the portion of carry logic circuit 700 illustrated in FIG. 7, it should be noted that transistors 702, 704, 712, 714, 718, 720, 730, and 732 are implemented as p-type transistors. Similarly, transistors 706, 708, 710, 716, 722, 724, 726, 728, and 734 are implemented as n-type transistors. Additionally, the transistors described herein for implementing the portion of carry logic circuit 700 implement the logical functions illustrated in FIG. 4 and have a logical truth table such as that illustrated in FIG. 5. It should be noted, however, that the logic functions represented by the configuration of transistors illustrated therein may be implemented in any number of ways, including transistors formed using other types of processing methodologies.

Figures 8, 8A:
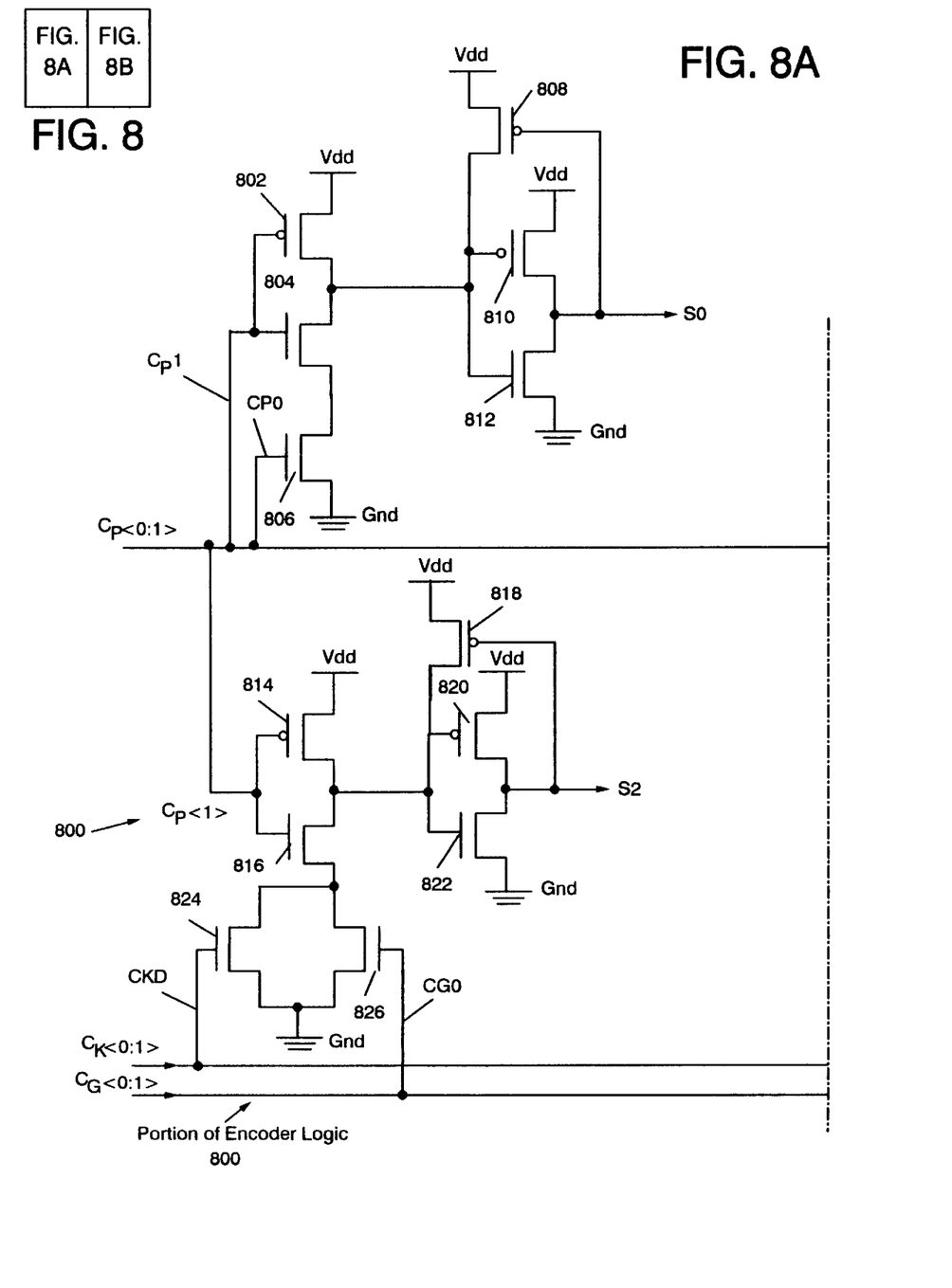
Figure 8B:
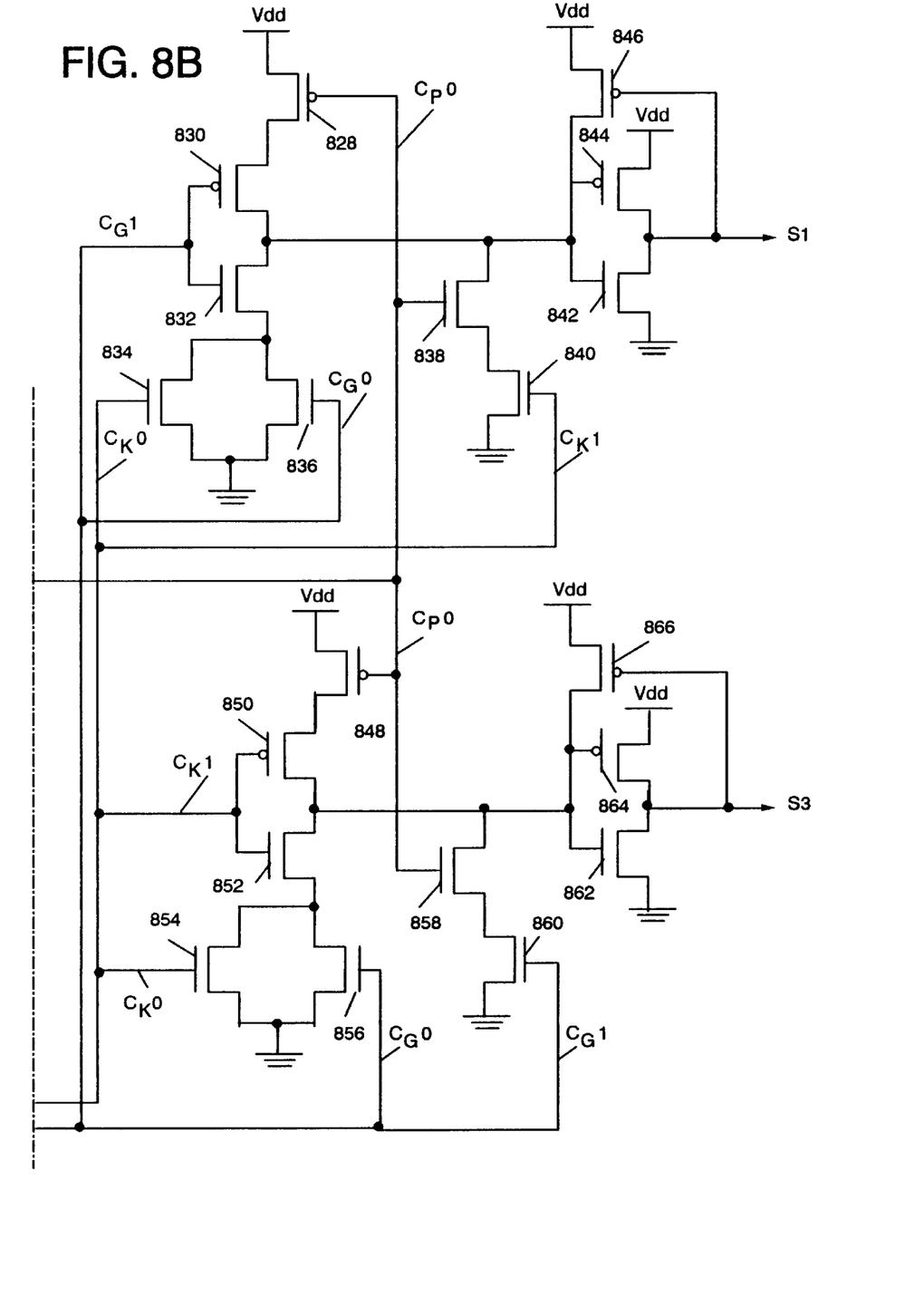

FIGS. 8-A and 8-B illustrate, in greater detail, encoder 800 of the adder illustrated in FIG. 3. Encoder 800 comprises a transistor 802, a transistor 804, a transistor 806, a transistor 808, a transistor 810, a transistor 812, a transistor 814, a transistor 816, a transistor 818, a transistor 820, a transistor 822, a transistor 824, a transistor 826, a transistor 828, a transistor 830, a transistor 832, a transistor 834, a transistor 836, a transistor 838, a transistor 840, a transistor 842, a transistor 844, a transistor 846, a transistor 848, a transistor 850, a transistor 852, a transistor 854, a transistor 856, a transistor 858, a transistor 860, a transistor 862, a transistor 864, and a transistor 866.

A $C_{p1}$ is provided to a control electrode of transistor 802, a control electrode of transistor 804, a control electrode of transistor 814, and a control electrode of transistor 816. The $C_{p0}$ signal is provided to a control input of transistor 806, a control electrode of transistor 828, a control electrode of transistor 848, and a control electrode of transistor 858. The $C_{k0}$ signal is provided to a control electrode of transistor 824, a control electrode of transistor 854, and a control electrode of transistor 834. The $C_{k1}$ is coupled to a control electrode of transistor 840, a control electrode of transistor 850, and a control electrode of transistor 852. The $C_{g0}$ signal is provided to a control electrode of transistor 826, a control electrode of transistor 836, and a control electrode of transistor 856. The $C_{g1}$ signal is coupled to a control electrode of transistor 830, a control electrode of transistor 832, and a control electrode of transistor 860.

A first electrode of transistor 802 is coupled to $V_{DD}$. A second electrode of transistor 802 is coupled to a first electrode of transistor 804, a first electrode of transistor 808, a control electrode of transistor 810, and a control electrode of transistor 812. A second electrode of transistor 804 is coupled to a first electrode of transistor 806 and a second electrode of transistor 806 is coupled to $V_{gnd}$. A second electrode of transistor 808 is coupled to $V_{DD}$. A first electrode of transistor 810 is coupled to $V_{DD}$ and a second electrode of transistor 810 is coupled to a control electrode of transistor 808 to provide an S0 signal and a first electrode of transistor 812. A second electrode of transistor 812 is coupled to $V_{gnd}$. A first electrode of transistor 814 is coupled to $V_{DD}$. A second electrode of transistor 814 is coupled to a first electrode of transistor 816, a first electrode of transistor 818, a control electrode of transistor 820, and a control electrode of transistor 822. A second electrode of transistor 818 is coupled to $V_{DD}$. A first electrode of transistor 820 is coupled to $V_{DD}$ and a second electrode of transistor 820 is coupled to a first electrode of transistor 822 and a control electrode of transistor 818 to provide the S2 signal. A second electrode of transistor 822 is coupled to $V_{gnd}$. A second electrode of transistor 816 is coupled to a first electrode of each of transistors 824 and 826. A second electrode of each of transistors 824 and 826 is coupled to $V_{gnd}$.

A first electrode of transistor 828 is coupled to $V_{DD}$. A second electrode of transistor 828 is coupled to a first electrode of transistor 830. A second electrode of transistor 830 is coupled to a first electrode of transistor 838, a first electrode of transistor 846, a control electrode of transistor 844, and a control electrode of transistor 842. A second electrode of transistor 846 is coupled to $V_{DD}$. A first electrode of transistor 844 is coupled to $V_{DD}$. A second electrode of transistor 844 is coupled to a first electrode of transistor 842 and a control electrode of transistor 846 to provide the S1 signal. A second electrode of transistor 842 is coupled to $V_{gnd}$. A second electrode of transistor 848 is coupled to $V_{gnd}$. A second electrode of transistor 838 is coupled to a first electrode transistor 840. A second electrode of transistor 840 is coupled to $V_{gnd}$. A second electrode of transistor 832 is coupled to a first electrode of each of transistors 834 and 836. A second electrode of each of transistors 834 and 836 is coupled to $V_{gnd}$.

A first electrode of transistor 848 is coupled to $V_{DD}$. A second electrode of transistor 848 is coupled to a first electrode of transistor 850. A second electrode of transistor 850 is coupled to a first electrode of transistor 852, a first electrode of transistor 866, a control electrode of transistor 864, and a control electrode of transistor 862. A second electrode of transistor 866 is coupled to $V_{DD}$. A first electrode of transistor 864 is coupled to $V_{DD}$ and a second electrode is coupled to a first electrode of transistor 862 and a control electrode of transistor 866 to provide the S3 signal. A second electrode of transistor 862 is coupled to $V_{gnd}$. Additionally, it should be noted that the second electrode of transistor 850 is coupled to the first electrode of transistor 858. A second electrode of transistor 858 is coupled to a first electrode of transistor 860. A second electrode of transistor 860 is coupled to $V_{gnd}$. A second electrode of transistor 852 is coupled to a first electrode of each of transistors 854 and 856. A second electrode of each of transistors 854 and 856 is coupled to $V_{gnd}$. In the portion of encoder 800 illustrated in FIGS. 8-A and 8-B, it should be noted that transistors 802, 808, 810, 814, 818, 820, 828, 830, 844, 846, 848, 850, 864, and 866 are implemented as p-type transistors. Similarly, transistors 804, 806, 812, 816, 822, 824, 826, 832, 834, 836, 838, 840, 842, 852, 854, 856, 858, 860, and 862 are implemented as n-type transistors. It should be noted, however, that the logic functions represented by the configuration of transistors illustrated therein may be implemented in any number of ways, including the use of transistors formed from other processing methodologies.

As the connectivity of the circuitry used to implement the present invention has been described in greater detail, operation of the circuitry will subsequently be provided.

Description of Operation

In the adder of the present invention, carry control signals are used to generate a B2 encoded output. The carry control signals are a carry kill ($C_k$), a carry propagate ($C_p$), and a carry generate ($C_g$). Each of these carry control signals is generated from data provided for use in an addition operation. The relationship between the input data and each of the carry control signals is illustrated in FIG. 2. As illustrated therein, a carry generate control signal ($C_g$) is a result of an AND operation between respective bits provided at two different inputs of an adder device. Because the $C_g$ signal is the result of an AND operation, corresponding bits on both inputs must both be asserted for a carry generate control signal to also be asserted. To determine whether or not a carry signal should be propagated, and, therefore, whether a carry propagate control signal should be asserted, the two inputs to the adder circuit must be logically OR'ed. To propagate a carry, either one or both of the inputs to the adder circuit must be asserted. To indicate that a carry should not be propagated, a carry kill control signal ($C_k$) is asserted. To generate the carry kill control signal, the data inputs to the adder circuit are logically NOR'ed. Thus, a $C_k$ signal is only asserted when both the data values provided on the A and B signals are negated. Once each of the $C_g$, $C_p$ and $C_k$ signals has been generated, they are each provided to adder 300 (see FIG. 3) to generate a sum which is B2 encoded.

In the adder illustrated in FIG. 3, assume that the A and B values provided to generate the $C_g$, $C_p$, and $C_k$ signals are 4 bits. Therefore, each of the $C_g$, $C_p$, and $C_k$ values will also be 4 bits. It should be noted that more or less bits may be used to implement the functionality of the present invention in data processing systems having more or less bits. Furthermore, during a subsequent discussion of adder 300, operation of a carry logic will first be discussed and generation of the encoded outputs will subsequently be discussed.

Carry logic circuit 400 and carry logic circuit 302 both have the same logical function illustrated in FIG. 4. However, note that the inputs provided to each are different and result in complementary $C_{gen}$ and $C_{prop}$ signals. A logic function performed to generate each of the $C_{gen}$ and $C_{prop}$ signals is illustrated in FIG. 4.

Referring to FIG. 4, assume that the $C_{gen}$ and $C_{prop}$ signals generated by carry logic circuit 400 will now be described in greater detail. To generate the $C_{gen}$ signal, the $C_{p2}$ and the $C_{k3}$ signals are provided to OR gate 402. Note that the $C_{p2}$ signal corresponds to bit 2 of the carry propagate control ($C_p$) signal. Likewise, the $C_{k3}$ signal corresponds to bit 3 of the carry kill control ($C_k$) signal. The $C_{p2}$ and $C_{k3}$ signals are logically OR'ed together and an output thereof is provided to OR gate 404. The $C_{k2}$ signal is also provided to the OR gate 404. In a manner similar to that described above, it should be noted that the $C_{k2}$ signal corresponds to bit 2 of the carry kill control signal. An output of OR gate 404 is the Cgen signal.

Figure 5:
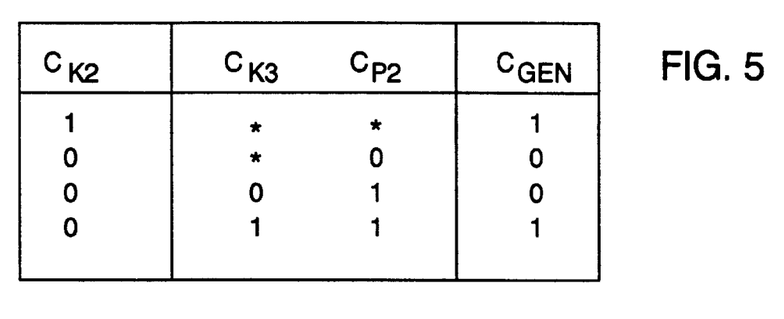
FIG. 5 illustrates, in tabular form, a logical relationship for generating a first carry signal output by the carry logic of FIG. 4.

A truth table illustrating the relationship between the $C_{gen}$ signal and each of the $C_{k2}$, $C_{k3}$, and $C_{p2}$ signals is illustrated in FIG. 5. As is illustrated therein, when the $C_{k2}$ signal is asserted, the $C_{gen}$ signal will also be asserted to indicated that a carry should be generated. As is illustrated in the truth table in FIG. 5, the $C_{gen}$ signal is only asserted when either the $C_{k2}$ signal is asserted or when both the $C_{k3}$ and $C_{p2}$ signals are asserted.

Referring against to FIG. 4, a logical relationship between generation of the $C_{prop}$ signals and each of the $C_{g3}$, $C_{p3}$, $C_{p2}$, and $C_{g2}$ signals is illustrated therein. To generate the $C_{prop}$ signal, the $C_{g3}$ and $C_{p3}$ are logically OR'ed using OR gate 406. An output of OR gate 406 is provided to an input of AND gate 408. Thus, the output of OR gate 406 is logically AND'ed with the $C_{p2}$ signal in AND gate 408. An output of AND gate 408 is coupled to OR gate 410. Additionally, a $C_{g2}$ signal is coupled to OR gate 410. An output of OR gate 410 is the $C_{prop}$ signal.

Figure 6:
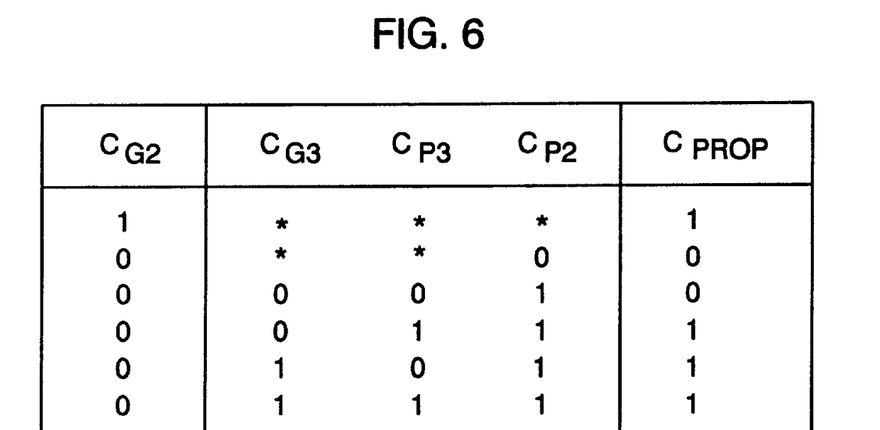
FIG. 6 illustrates, in tabular form, a logical relationship for generating a second carry signal output by the carry logic of FIG. 4.

FIG. 6 provides a truth table which illustrates the relationship between the $C_{prop}$ signal and each of the $C_{g2}$, $C_{g3}$, $C_{p3}$, and $C_{p2}$ signals. From the truth table, it may be observed that the $C_{prop}$ signal is negated to indicate that a carry should not be propagated when the $C_{g2}$ signal is negated and the $C_{p2}$ is negated and when the $C_{g2}$ is negated and both the $C_{g3}$ and $C_{p3}$ signals are negated.

FIG. 7 illustrates a circuit diagram for implementing one embodiment of carry logic circuit 400. It should be noted that this circuit representation is provided to enable one with ordinary skill in the art to implement carry logic circuit 400 such that the $C_{gen}$ and $C_{prop}$ signals may be properly generated. However, it should also be well understood by one with skill in the art that additional configurations and processing methodologies may be implemented to generate the $C_{gen}$ and $C_{prop}$ signals, as long as the corresponding truth tables of FIGS. 5 and 6 are complied with and implemented.

As previously mentioned, carry logic circuit 302 has a similar configuration as carry logic circuit 400. However, the $C_{gen}$ and $C_{prop}$ signals generated therefrom are complements of the $C_{gen}$ and $C_{prop}$ signals generated by carry logic circuit 400. This difference results from the fact that $C_{g2}$ and $C_{g3}$ signals are provided as $C_{k2}$ and $C_{k3}$ inputs of carry logic circuit 302. Thus, where carry kill (Ck) control signals are provided to inputs in carry logic circuit 400, carry generate (Cg) control signals are provided to carry logic circuit 302. Adder 300 was designed to generate such complementary $C_{gen}$ and $C_{prop}$ signals to enable each of the multiplexers 306 and 308 to output alternate concatenations of sum signals provided by encoder 800. By insuring that the two possible concatenations are both provided to multiplexer 310, multiplexer 310 is then able to select either an incremented version or a non-incremented version depending on a value of a Carry In signal provided by another stage of an adder circuit not illustrated herein. The use of the multiplexers in this manner will subsequently be described in greater detail.

Figure 9:
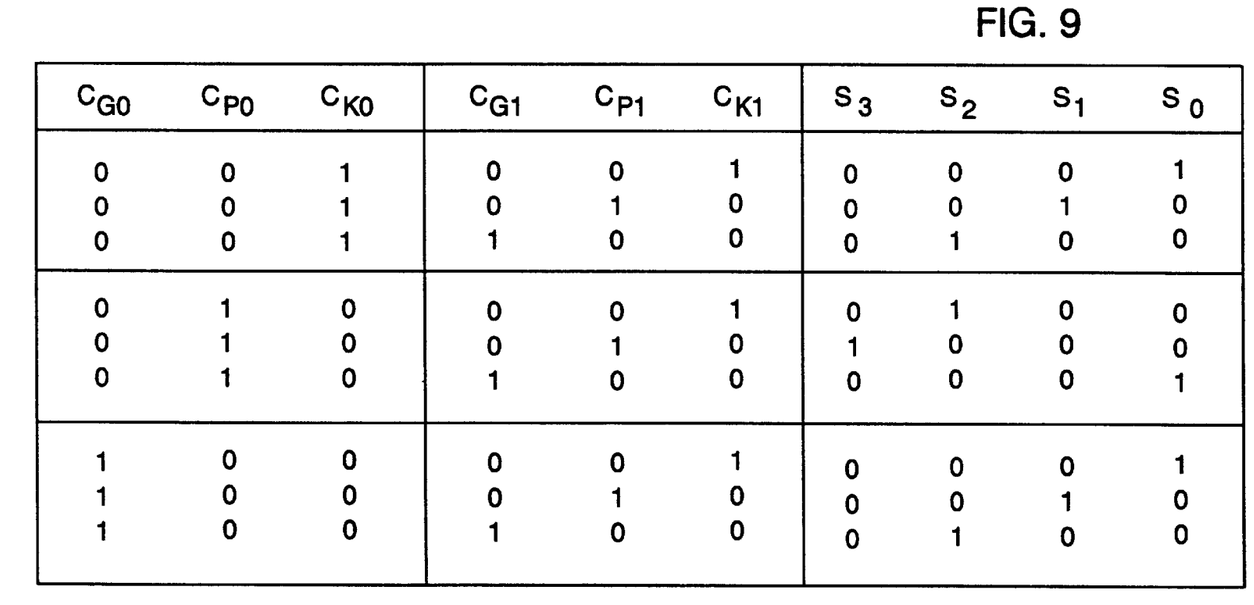
FIG. 9 illustrates, in tabular form, a logical relationship for generating a plurality of some bits output by the encoder of FIGS. 8-A and 8-B.

The $C_{gen}$ and $C_{prop}$ signals are provided by carry logic circuits 400 and 302 to respectively enable multiplexer 306 and multiplexer 308 to select one of two values generated by the concatenation of some outputs provided by encoded 800. Encoder 800 will subsequently be described in greater detail with reference to FIGS. 8-A and 8-B, and FIG. 9. Encoder circuit 800 performs the B2 encoding on $C_k$, $C_p$ and $C_g$ inputs thereto. The generation of the sum signals, S0, S1, S2, and S3, by encoder 800 is based on a dependency between a frrst bit being summed a subsequent bit. For example, assume that for a bit 0, only the carry kill ($C_k$) is asserted and the $C_g0$ and $C_p0$ signals are negated. If, a next bit 1 also generates a carry kill control signal which is also asserted and carry generate and carry propagate ($C_g1$ and $C_{p2}$) which are also negated, encoder circuit 800 of FIGS. 8-A and 8-B will generate an asserted S0 signal and negated S1, S2, and S3 signals. However, if the next bit 1 generates an asserted carry propagate ($C_{p1}$) signal, while the $C_{g1}$ and $C_{k1}$ signals are negated, the S0 signal is negated and the S1 signal is asserted. It should be noted that the S2 and S3 signals remain negated. As is illustrated in FIG. 9, the B2 encoding scheme provides the message in which a signal is only asserted for a corresponding sum value. Thus, when the S3 signal is asserted, the sum has a value of 4 as the S3 signal represents a fourth bit position of the sum. Similarly, when the S1 signal is asserted, the sum has a value of 2 as the S1 signal is in the second bit position. For a review of B2 encoding, refer to Table 1, previously illustrated and discussed herein.

After each of the S0, S1, S2, and S3 signals is generated, they are selectively concatenated and provided to multiplexers 306 and 308. In a first form, the S0, S1, S2 and S3 values are concatenated to have a form in which the S0 value is at a 0 bit position of a resulting value. Additionally, the S3 value is at a 1 bit position, the S2 value is at a 2 bit position, and the S1 value is at a 3 bit position of the value provided to multiplexer 306. In a second form, the S0 through S3 values are arranged so that the S3 values is at a 0 bit position, the S2 value is at a 1 bit position, the S3 value is at a 2 bit position, and the S0 value is at a 3 bit position.

Notice that the two values provided to multiplexer 306 include a first value and then an incremented version of that first value. For additional explanation, note that the initial value is formed by the concatenation of S0, S1, S2 and S3. When this first value is incremented in response to a carry propagate signal, the B2 encoding scheme performs the increment operation by merely shifting each bit to the left one bit position and wrapping a value in a last bit position back around to the first, or 0 bit position. Thus, if the value presented by the concatenation of the S0, S1, S2, and S3 values is incremented, a result would be formed by the concatenation of the S1, S2, S3 and S0 values. As may be noted from FIG. 3, this incremented value is provided by the In0 input of multiplexer 306, while the initial value is provided to the In1 input of multiplexer 306. Therefore, when the $C_{prop}$ signal is asserted to indicate that a carry is being propagated to the summed value and it should be incremented, the value provided to the In0 input of multiplexer 306 is output therefrom. Likewise, if carry logic circuit 400 indicates that a carry should be generated in response to the summation operation, then the initial value is provided as it should not yet be incremented.

It should be noted that the same concatenated values are provided to the In1 and In0 inputs of multiplexer 308. However, the inputs to carry logic circuit 302 are configured in such a manner that $C_{gen}$ and $C_{prop}$ signals are complements of those provided to multiplexer 306. Therefore, multiplexer 308 will provide an opposite one of the concatenated values provided by multiplexer 306 to an In0 input of multiplexer 310. Additionally, a value output by multiplexer 310 is determined by a logic value of a carry in signal generated by another adder or another adder stage. This additional adder or adder stage is not illustrated herein as such stages are well-known in the data processing art and implementation and use of a carry in signal to a subsequent adder stage is well-known to those with skill in the art. In multiplexer 310, if the carry in signal is asserted, the concatenated value provided to the In1 input of multiplexer 310 is output as bits 0–3 of a final summed value.

Encoder 304 is implemented in a similar manner to encoder 800. However, the $C_k$<2:3> signal is provided in place of the $C_k$<0:1> signals. Additionally, the $C_p$<2:3> signal is provided to the $C_p$<0:1> input at encoder 302. Likewise, the $C_g$<2:3> signal is provided to the $C_g$<0:1> input of encoder 304. Encoder 304 uses the circuit disclosed in FIGS. 8-A and 8-B with these modified inputs to generate the T0, T1, T2, and T3 outputs as the sum 0, sum 1, sum 2, and sum 3 outputs, respectively thereof. As with encoder 800, the T0, T1, T2, and T3 outputs are selectively concatenated to have a value formed by a T0, T1, T2, T3 concatenation or a value formed by a T1, T2, T3, T0 concatenation. The "T0, T1, T2, T3" value is provided to an In0 input of multiplexer 312. Similarly, a "T1, T2, T3, T0" value is provided to an In1 input thereof. As with multiplexer 310, the Carry In signal and a complement thereof, multiplexer 312 provides one of the concatenated values as bits 4–7 of the summed value. This summed value generates a B2 encoded value which may then be used by circuitry which utilizes such B2 encoding.

Example of Operation

An example of operation will be described next to clarify operation of the adder of the present invention. In this example, assume that two 4-bit data values, A and B, will be summed. Assume that data value A has a decimal value of 3 and a binary value of 0011. Furthermore, assume data value B has a decimal value of 5 and a corresponding binary value 0101.

To produce the carry generate ($C_g$), carry propagate ($C_p$), and carry kill ($C_k$) control signals, the logic circuit illustrated in FIG. 2 must be used. When utilizing this logic function, which is well-known in the data processing art, a resulting carry generate ($C_g$) signal has a binary value of 0001. A resulting carry propagate ($C_p$) value has a binary value of 0110. Likewise, a carry kill ($C_k$) signal has a binary value of 1000. When each of these $C_g$, $C_p$, and $C_k$ values is provided to carry logic circuit 400, the $C_{gen}$ will be asserted to indicate that a carry has been generated. Additionally, encoder 800 will provide the S0, S1, S2 and S3 values to be used for the concatenated values provided to multiplexer 306. When the $C_g$, $C_p$, and $C_k$ calculated above are utilized, the resulting S0, S1, S2, and S3 values are 0, 0, 1, and 0, respectively. When the $C_{gen}$ signal is asserted, multiplexer 306 outputs a value of "0100." Likewise, encoder 304 outputs a value of "0001." The two value are then concatenated and provided on Out bus as a value of "01000001."

From the explanation and examples provided above, it may be observed that the present invention provides a unique adder which utilizes B2 encoding to preserve power. Because only one bit line per two bits is ever driven in a B2 encoded format, less power is consumed than binary true/complement encoding which requires that two lines always be driven per two bits. Additionally, the adder of the present invention utilizes another feature of the B2 encoding scheme to more efficiently execute increment operations. Because an increment operation in a B2 encoded scheme results in a rotation operation, increment operations may be efficiently and easily executed. To perform such an increment operation, a first input would be "A," a second input would be "0," and a carry in would be provided.

The implementation of the invention described herein is provided by way of example only. However, many other implementations may exist for executing the function described herein. For example, other processing techniques could be used to implement the adder of the present invention in NMOS, Bipolar, GaAs, and BiCMOS circuits. As well, the logic circuitry of the present invention is provided by way of example only and it should be known to one with skill in the art that many other logical configurations exist for performing the encoding and carry generation functions described herein.

While there have been described therein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. An adder for generating a result of an addition operation, comprising:

input means for receiving first and second operands to produce carry signals; and an encoder coupled to the input means for receiving the carry signals, the encoder providing the first encoded sum value, wherein only one bit of the sum value is asserted, to generate the result of the addition operation in response to the first and second operands.

2. The adder of claim 1, further comprising:

output means coupled to the first encoder for providing the first encoded sum value and the result of the addition operation.

3. The adder of claim 1 further comprising:

a carry logic circuit coupled to the input means for receiving the carry signals, the carry logic circuit generating a first carry propogate signal in response to the carry signals.

4. The adder of claim 3 wherein the encoder generates a second encoded sum value.

5. The adder of claim 4, wherein the second encoded sum value corresponds to the first encoded sum value after the first encoded sum value has been incremented.

6. The adder of claim 4, further comprising:

a multiplexer coupled to the first carry logic circuit for selectively providing one of the first encoded sum value and the second encoded sum value as a partial result of the addition operation in response to the first carry propagate signal.

7. The adder of claim 6 wherein the encoder provides a third encoded sum value.

8. The adder of claim 7 wherein the partial result of the addition operation and the third encoded sum value are concatenated to generate the result of the addition operation.

9. The adder of claim 1, further comprising:

a logic circuit for receiving a first sum value and a second sum value, the logic circuit logically combining the first sum value and the second sum value to generate the carry signals.

10. The adder of claim 1 wherein only a single bit is asserted in the first encoded sum value.

11. A method for adding a first value and a second value to generate a sum, comprising the steps of:

generating carry values in response to the first value and the second value;

encoding the carry values using a first encoding technique, wherein the first encoding technique is a B2 encoding technique, to generate a first encoded sum; and selectively providing the first encoded sum to an output means.

12. The method of claim 11, further comprising the steps of:

generating a carry generate values in response to the carry value; and selectively providing the first encoded sum to the output means when the carry generate value is a first logic level.

13. The method of claim 11, further comprising the step of:

encoding the carry values to generate an incremented first encoded sum.

14. The method of claim 13, further comprising the steps of:

generating a carry generate values in response to the carry value;

selectively providing the first encoded sum to the output means when the carry generate value is a first logic level; and selectively providing the incremented first encoded sum to the output means when the carry generate value is a second logic level.

15. The method of claim 11, further comprising the steps of:

encoding the carry values to generate a second encoded sum; and selectively providing the second encoded sum to the output means.

16. The method of claim 15, further comprising the step of:

concatenating one of the first encoded sum and the incremented encoded sum and the second encoded sum to generate the sum.

17. An adder system, comprising:

a logic circuit for receiving a first value and a second value, the logic circuit generating a carry signal;

an adder circuit, comprising:

a first carry logic circuit coupled to the logic circuit for receiving a first portion of the carry signal and for generating a first carry generate signal;

a second carry logic circuit coupled to the logic circuit for receiving a second portion of the carry signal and for generating a second carry generate signal;

a first encoder coupled to the logic circuit for receiving a third portion of the carry signal and for generating a first encoded sum and an incremented first encoded sum;

a second encoder coupled to the logic circuit for receiving a fourth portion of the carry signal and for generating a second encoded sum and an incremented second encoded sum; and a first multiplexer coupled to the first carry logic circuit for receiving the first carry generate signal and coupled to the first encoder for receiving the first encoded sum and the incremented first encoded sum, the first multiplexer generating a first portion of a result; and a second multiplexer coupled to the second carry logic circuit for receiving the second carry generate signal and coupled to the second encoder for receiving the second encoded sum and the incremented second encoded sum, the second multiplexer generating a second portion of the result.

18. The adder system of claim 17, further comprising:

output means for providing the result, the output means being coupled to the first multiplexer and the second multiplexer to receive the first portion of the result and the second portion of the result, the output means concatenating the first portion of the result and the second portion of the result to generate the result.

19. The adder system of claim 18 wherein the first encoded sum, the incremented first encoded sum, the second encoded sum, and the incremented second encoded sum are encoded using a B2 encoding technique.

* * * * *

UNITED STATES PATENT AND TRADEMARK OFFICE
CERTIFICATE OF CORRECTION

PATENT NO. : 6,055,557
DATED : April 25, 2000
INVENTOR(S) : John Andrew Beck, James Edward Dunning; John Stephen Muhich It is certified that error appears in the above-identified patent and that said Letters Patent is hereby corrected as shown below:

Column 1, Line 39 after "Carry_in(i "  delete "-1"

Signed and Sealed this

Twenty-second Day of May, 2001

Attest:

NICHOLAS P. GODICI

*Attesting Officer*          *Acting Director of the United States Patent and Trademark Office*